United States Patent
Furuta et al.

(10) Patent No.: US 8,113,578 B2
(45) Date of Patent: Feb. 14, 2012

(54) VEHICLE SEAT

(75) Inventors: Masaya Furuta, Shioya-gun (JP); Kenichi Niitsuma, Shioya-gun (JP)

(73) Assignee: TS Tech Co., Ltd., Saitama-ken (JP)

( * ) Notice: Subject to any disclaimer, the term of this patent is extended or adjusted under 35 U.S.C. 154(b) by 206 days.

(21) Appl. No.: 12/303,204

(22) PCT Filed: Jun. 2, 2007

(86) PCT No.: PCT/JP2007/061228
§ 371 (c)(1),
(2), (4) Date: Nov. 24, 2009

(87) PCT Pub. No.: WO2007/142162
PCT Pub. Date: Dec. 13, 2007

(65) Prior Publication Data
US 2010/0060047 A1 Mar. 11, 2010

(30) Foreign Application Priority Data

Jun. 2, 2006 (JP) .................................. 2006-155457
Jun. 2, 2006 (JP) .................................. 2006-155458

(51) Int. Cl.
*B60N 2/427* (2006.01)
(52) U.S. Cl. .......... 297/216.13; 297/216.12; 297/216.14
(58) Field of Classification Search ............. 297/216.12, 297/216.13, 216.14
See application file for complete search history.

(56) References Cited

U.S. PATENT DOCUMENTS

| | | | |
|---|---|---|---|
| 6,523,892 B1 * | 2/2003 | Kage et al. | 297/216.13 |
| 6,779,840 B1 * | 8/2004 | Farquhar et al. | 297/216.12 |
| 6,837,541 B2 * | 1/2005 | Farquhar et al. | 297/216.13 |
| 7,044,544 B2 * | 5/2006 | Humer et al. | 297/216.12 X |
| 7,284,794 B2 * | 10/2007 | Yamaguchi et al. | 297/216.12 X |
| 2008/0129092 A1 | 6/2008 | Omori | |

FOREIGN PATENT DOCUMENTS

| | | |
|---|---|---|
| JP | 2000325179 A | 11/2000 |
| JP | 2003267107 A | 9/2003 |
| JP | 2006122297 A | 5/2006 |

* cited by examiner

*Primary Examiner* — Anthony D Barfield
(74) *Attorney, Agent, or Firm* — Browdy and Neimark, PLL

(57) ABSTRACT

A vehicle seat comprises a headrest mounted on the seatback frame so as to be movable in a front-and-back direction, a cushion plate mounted on the seatback frame, and a collision detector provided at back side of cushion plate. The headrest is connected to the collision detector by way of a active headrest mechanism. When the collision detector is moved backward, the headrest is moved forward. A space part is formed between an upper edge of the cushion plate and an upper frame of the seatback frame. The space part is enlarged by forming the upper frame by a pipe frame.

5 Claims, 6 Drawing Sheets

VEHICLE SEAT

TECHNICAL FIELD

The present invention relates to a vehicle seat equipped with a function to cause a headrest to move forward to protect the head of a vehicle seat occupant seated person when the seat occupant is moved backward with respect to the vehicle seat due to a collision from the rear (so-called "rear-end collision").

BACKGROUND ART

A conventional headrest is moved forward when a collision detector provided in a seatback is pressed backward by a vehicle seat occupant due to a rear-end collision.

Patent Document 1: JP 2006-117129 A

DISCLOSURE OF THE INVENTION

With a conventional seatback equipped with a collision detector, it is difficult to efficiently support an upper part of the back of a vehicle seat occupant. That is, a wide space part is needed to be disposed on an upper side of the seatback to efficiently support the upper side of the back of a seat occupant, but such design is not easy.

Thus, an object of the present invention is to provide a vehicle seat that allows the upper side of the back of a seat occupant to be deeply absorbed into a seatback when a rear-end collision occurs.

BEST MODE FOR CARRYING OUT THE INVENTION

Figure 1:
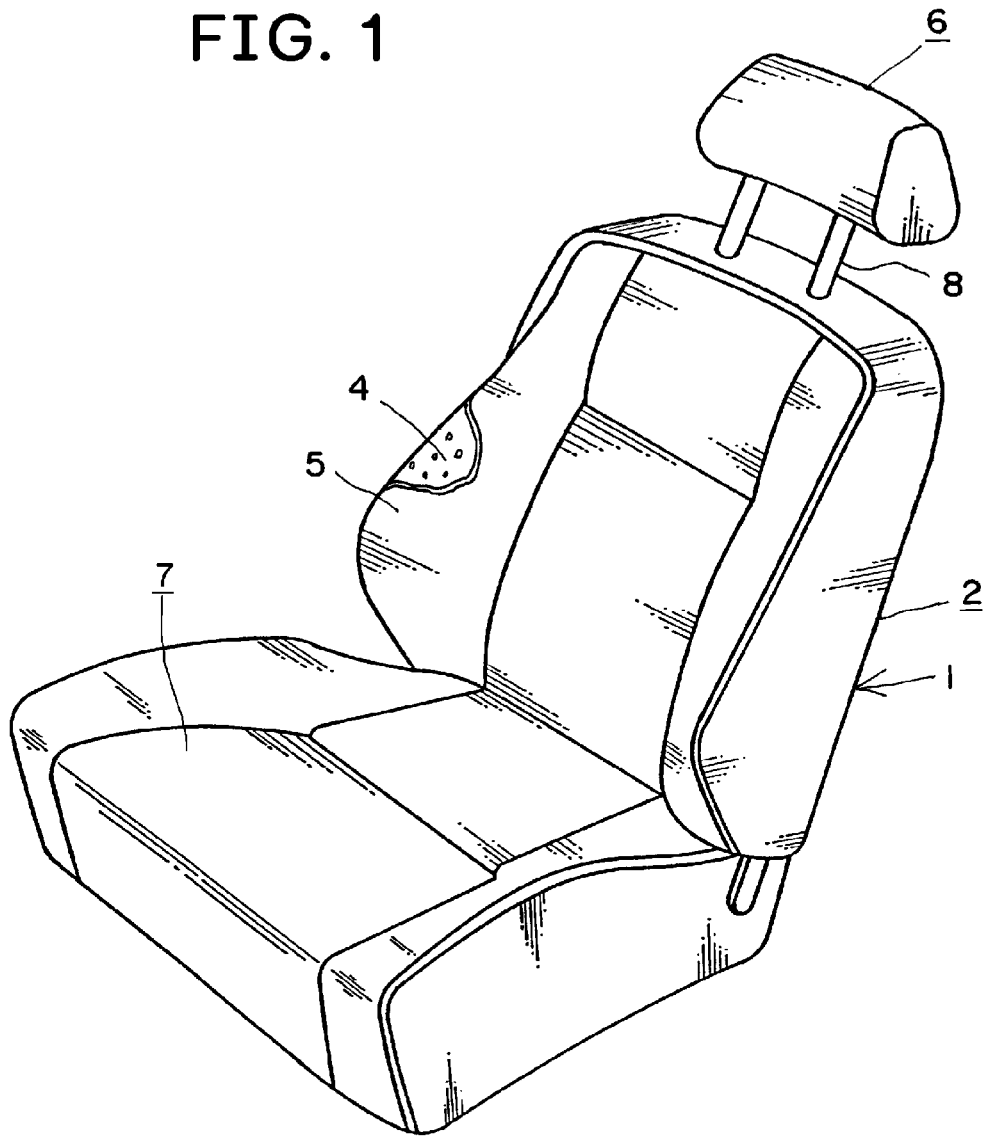
FIG. 1 is a perspective view of a vehicle seat.
Figure 2:
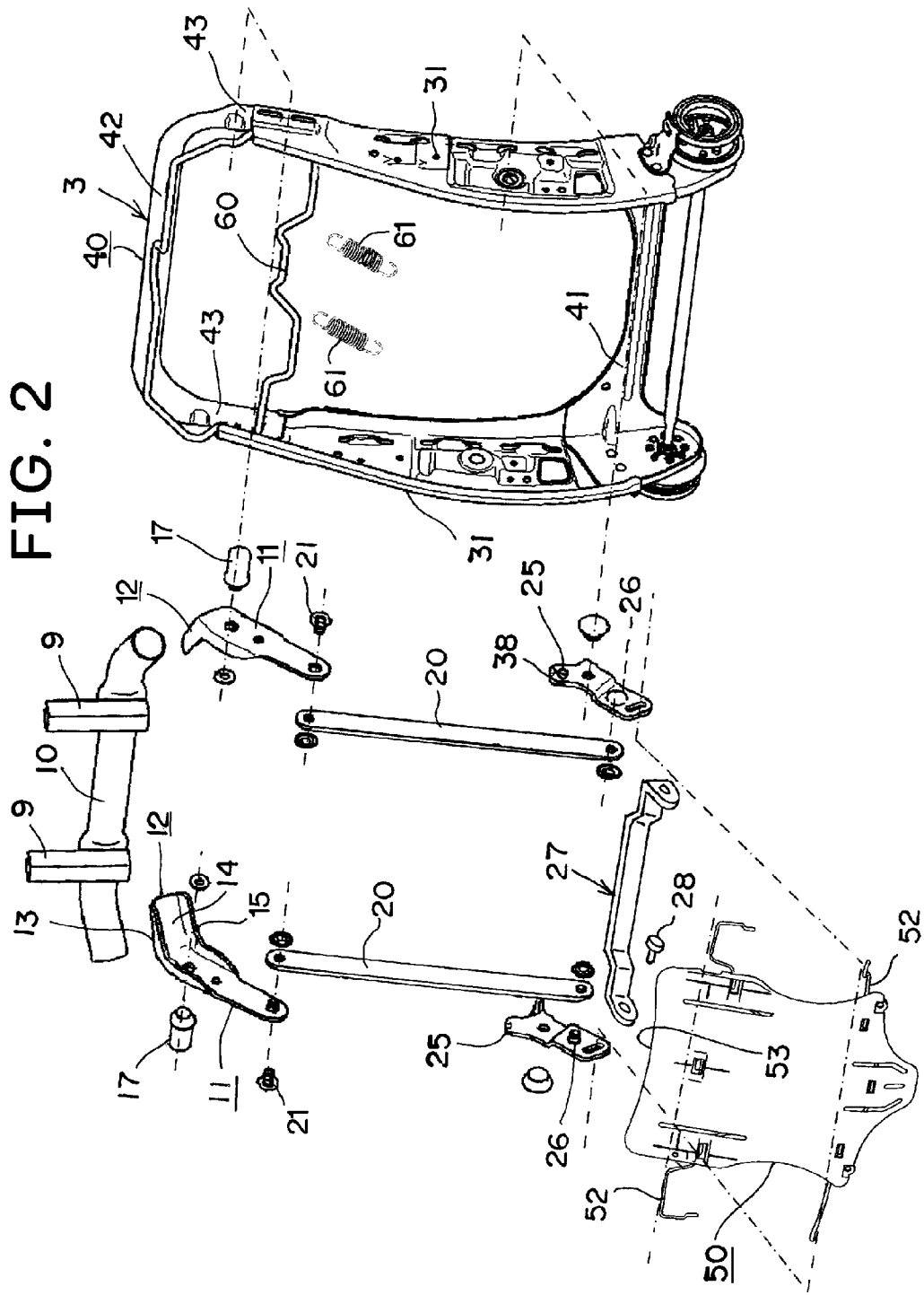
FIG. 2 is an exploded perspective view of a seatback frame of the vehicle seat.
Figure 3:
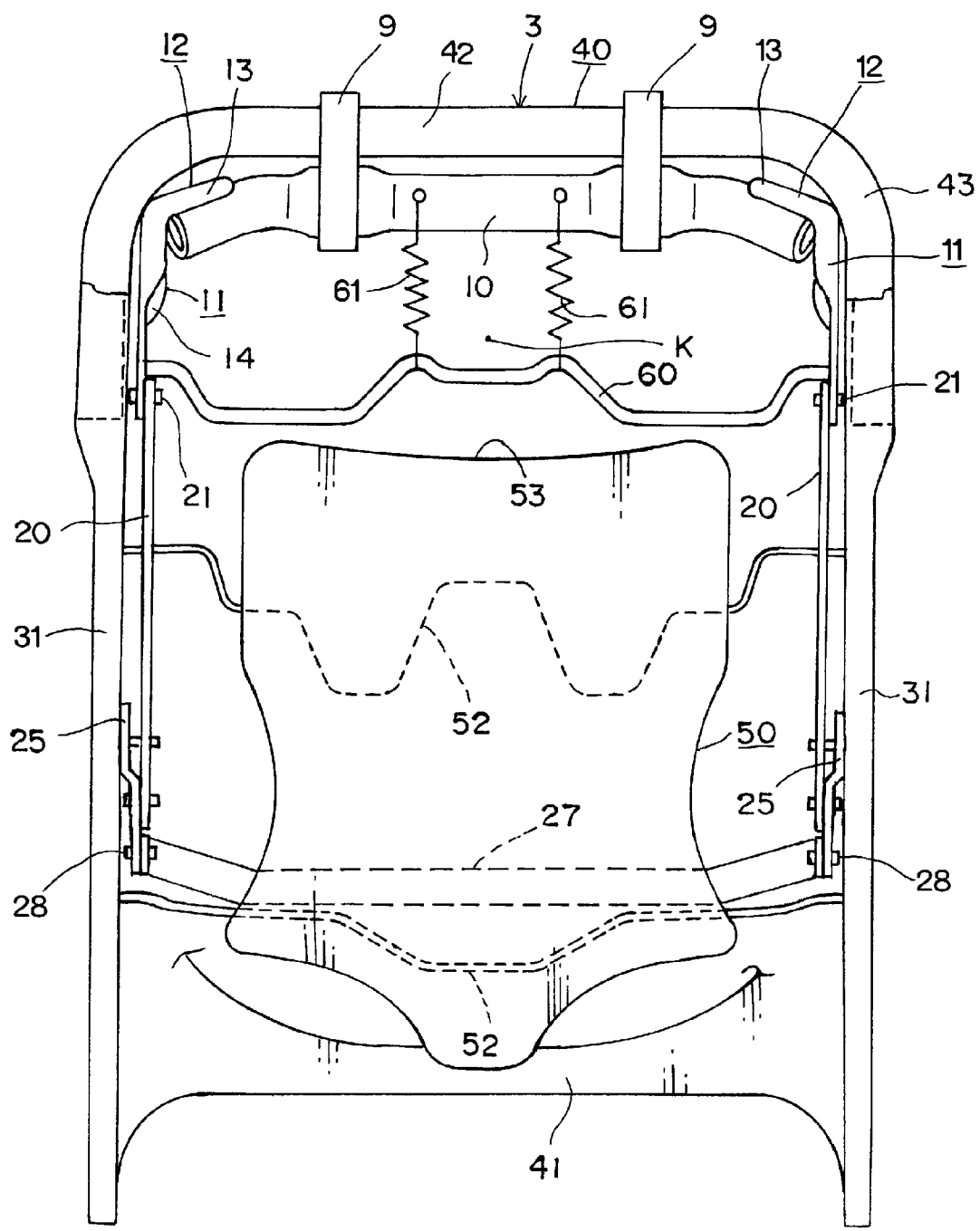
FIG. 3 is a front view of the seatback frame.

To describe an embodiment of the present invention with reference to the drawings, a vehicle seat 1 in the present invention has a seatback 2, a seat bottom 7, and a headrest 6 provided in an upper part of the seat bottom 7. The headrest 6 is movable substantially forward toward a forward head protection position from a normal support position due to a collision load caused by a rear-end collision of a vehicle. A seatback frame 3 of the seatback 2 has a pair of side frames 31, an upper connecting frame 40 and a lower connecting frame 41 and shows a rectangular frame form as a whole. A cushion 4 is installed on the seatback frame 3 and the front side of the cushion 4 is covered with a skin member 5.

A headrest supporter 10 that is movable relative to the seatback frame 3 and extends in a lateral direction is arranged in the vicinity of the upper frame 40. Vertical engagement parts 9 into which lower parts of pillars 8 of the headrest 6 are inserted are fixed to the supporter 10. The headrest 6 is supported freely height-adjustably by the pillars 8 and the vertical engagement parts 9.

A lengthwise upper link lever 11 is fixed by a pivot 17 in an upper part of each of the side frames 31 (or both sides of the upper frame 40). Each end of the headrest supporter 10 is fixed to a connecting part 12 formed in an upper part of the upper link lever 11. The supporter 10 is preferably formed from a metal pipe. The connecting part 12 is preferably formed in a C-letter shape and has a back plate 14 to support a rear surface part of the supporter 10, a top plate 13 to support a top surface part of the supporter 10, and a bottom plate 15 to support an undersurface of the supporter 10. A lower part of the upper link lever 11 is connected to an upper part of a connecting rod 20 by a pin 21.

A support rod 60 that extends in the lateral direction is arranged between the side frames 31. Upper springs 61 are provided between the support rod 60 and the headrest supporter 10 and the headrest supporter 10 (the headrest 6) is energized toward the rear by elastic force of the upper springs 61 to be maintained in the normal support position. If, however, the upper link lever 11 is rotated counterclockwise around the pivot 17 in FIG. 4, the headrest supporter 10 is moved forward against the elastic force of the upper springs 61 so that the headrest 6 is pushed forward toward the head protection position.

A flexible cushion plate 50 is arranged inside the seatback frame 3. The cushion plate 50 is preferably formed from synthetic resin such as polypropylene and shows a substantially single rectangular plate form. The cushion plate 50 is installed on seat springs 52 such as zigzag springs and formed wire springs. The seat spring 52 has at least an upper seat spring and a lower seat spring. Each of the seat springs 52 extends substantially in the lateral direction and both ends thereof are connected to the side frames 31, 31 of the seatback frame 3. The cushion 4 of the seatback 2 is positioned in front of the cushion plate 50 and supported elastically by the cushion plate 50.

When the cushion plate 50 receives a normal load from a vehicle seat occupant T through the cushion 4, the cushion plate 50 is moved backward within a predetermined range against elastic force of the springs 52 while being subjected to elastic deformation appropriately to flexibly support the seat occupant T. Because the cushion plate 50 supports the cushion 4 by the "surface", the load of the seat occupant T is distributed and, compared with a conventional structure in which the cushion 4 is supported by the seat springs 52 alone, better stability and comfort are provided to the seat occupant T.

Figure 8:
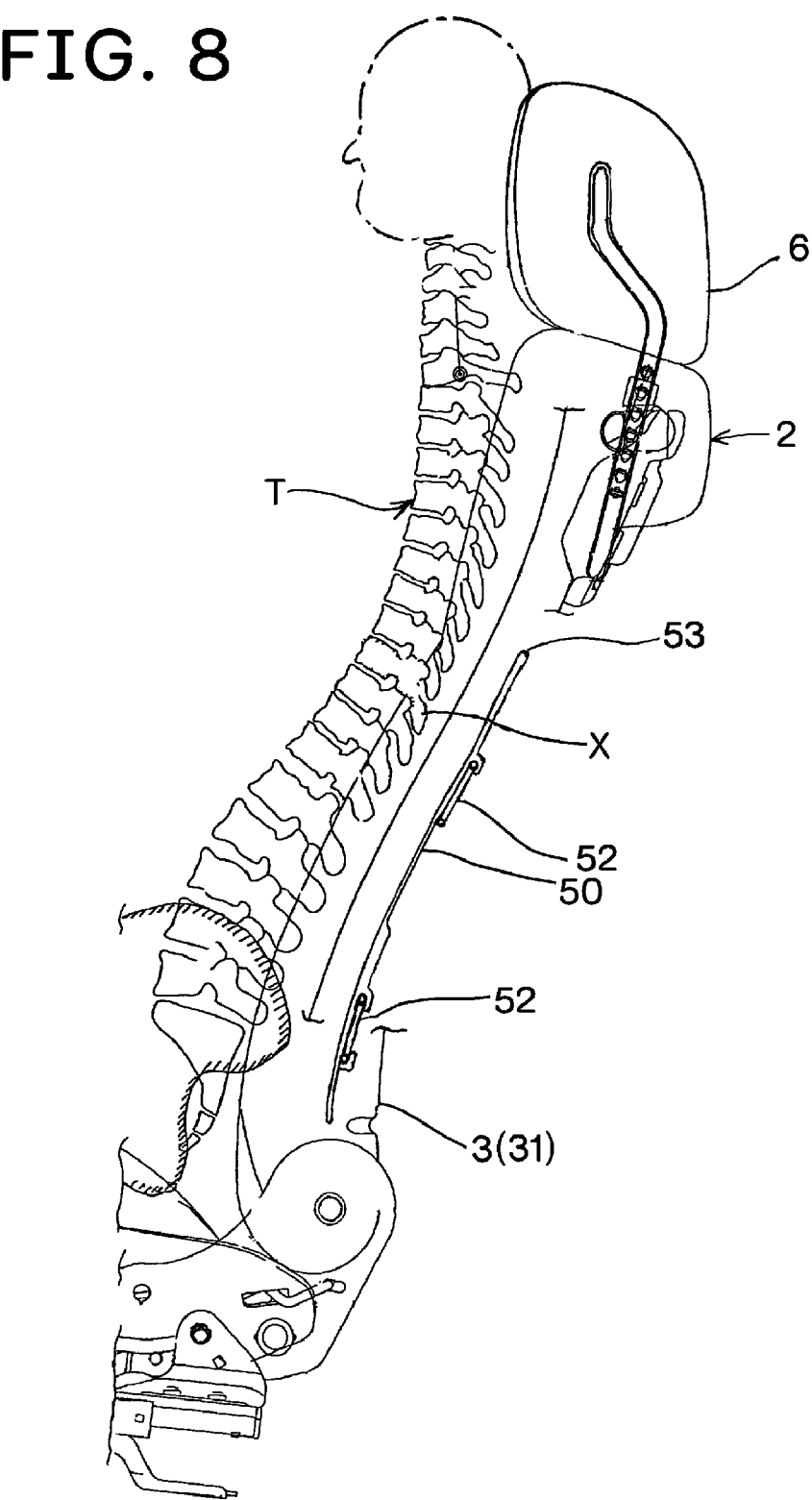
FIG. 8 is a side view showing a relationship between a skeleton of a vehicle seat occupant and a cushion plate.

As shown in FIG. 8, an upper edge 53 of the cushion plate 50 is positioned slightly above the ninth thoracic vertebrae X of the seat occupant T of an average height. The center of gravity of an upper body of the seat occupant T is located around the ninth thoracic vertebrae X. In a seated posture, the magnitude of movement of the upper body is the least near the ninth thoracic vertebrae X. If the upper edge 53 is positioned above the ninth thoracic vertebrae X, the cushion plate 50 can support movement of many parts of the upper body so that the upper body can effectively be supported.

If the position of the upper edge 53 is set with reference to the position of the ninth thoracic vertebrae X, the position of the upper edge 53 can be set lower and a wide space part K can thereby be secured between the upper edge 53 and a horizontal pipe frame 42 of the upper frame 40. The wide space part K efficiently absorbs energy of backward movement of the upper body (near the thoracic vertebrae) of the seat occupant T when a rear-end collision occurs. Thus, in this application, the wide space part K is made easily securable by making the vertical width of the upper frame 40 smaller, while at the same time securing rigidity of the upper frame 40 by forming the upper frame 40 from a pipe member.

A collision detector 27 that extends in the lateral direction is arranged between the side frames 31, 31. The collision detector 27 is disposed at the rear and in the vicinity of the cushion plate 50. Both sides of the collision detector 27 are respectively connected, by pins 28, 28, to lower links 25, 25 fixed to the side frames 31, 31 by pivots 33, 33. A lower part of the connecting rod 20 is connected to the lower link 25 by a pin 26.

If the vehicle seat 1 is moved relatively forward with respect to the seat occupant T due to a rear-end collision, a collision load exceeding the normal load is applied to the cushion plate 50 and the cushion plate 50 is thereby moved backward exceeding the predetermined range and then, brought into contact with the collision detector 27 to move the collision detector 27 backward. Backward movement of the detector 27 rotates the lower link 25 counterclockwise in FIG. 4 to move the connecting rod 20 downward. Downward movement of the connecting rod 20 rotates the upper link lever 11 counterclockwise and the headrest supporter 10 is thereby moved forward to push the headrest 6 forward so that the head (cervical part) of the seat occupant T is protected when a rear-end collision occurs. The mechanism to push the headrest 6 forward by backward movement of the collision detector 27 is an active headrest mechanism.

Figure 6:
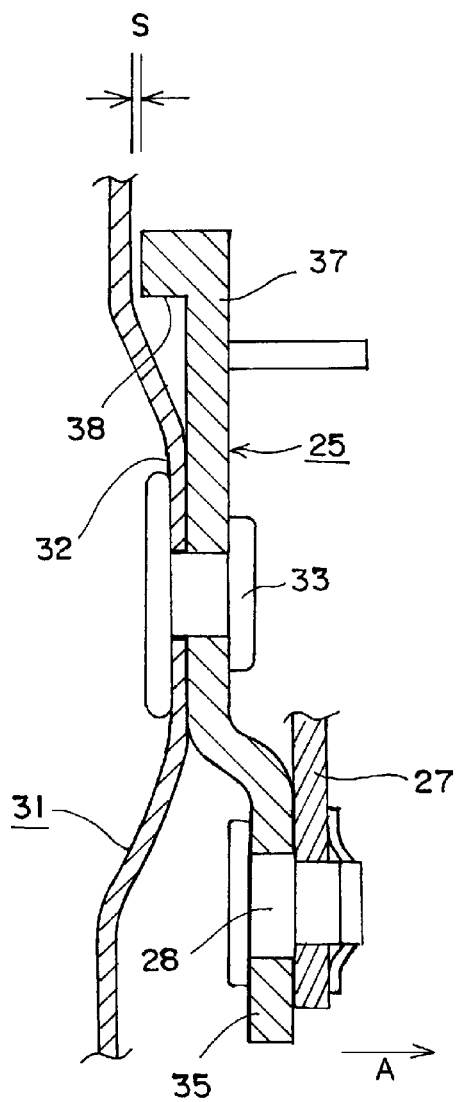
FIG. 6 is a sectional view of the connecting part of the lower link and the collision detector.
Figure 7:
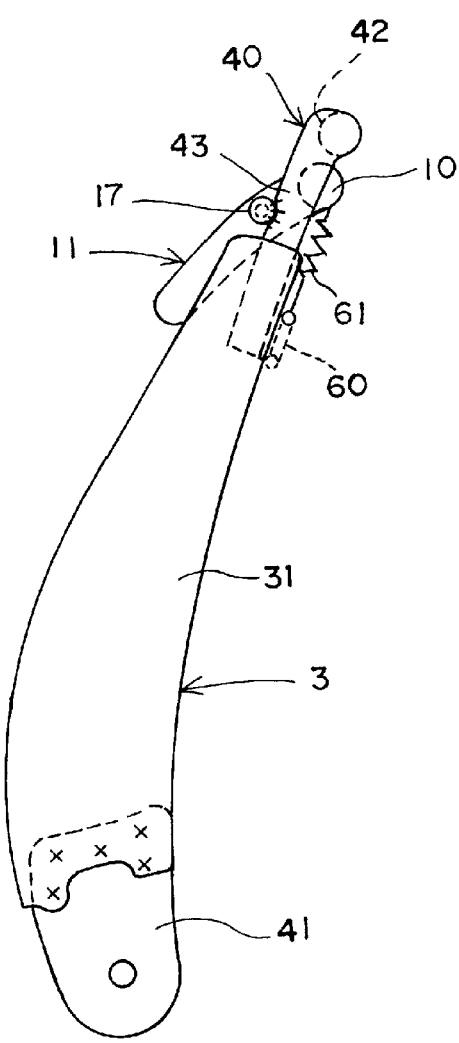
FIG. 7 is a side view of the seatback frame.

As clearly shown in FIG. 6, the lower link 25 is installed on an inside bulged part 32 of the side frame 31 by a pivot 33. The lower link 25 has a connecting arm 35 connected to the collision detector 27 and a counter arm 37 extending in the opposite direction of the connecting arm 35. The counter arm 37 has a support projection 38 extending toward the side frame 31. When the collision detector 27 does not operate, a gap S is formed between the support projection 38 and the side frame 31.

Figure 4:
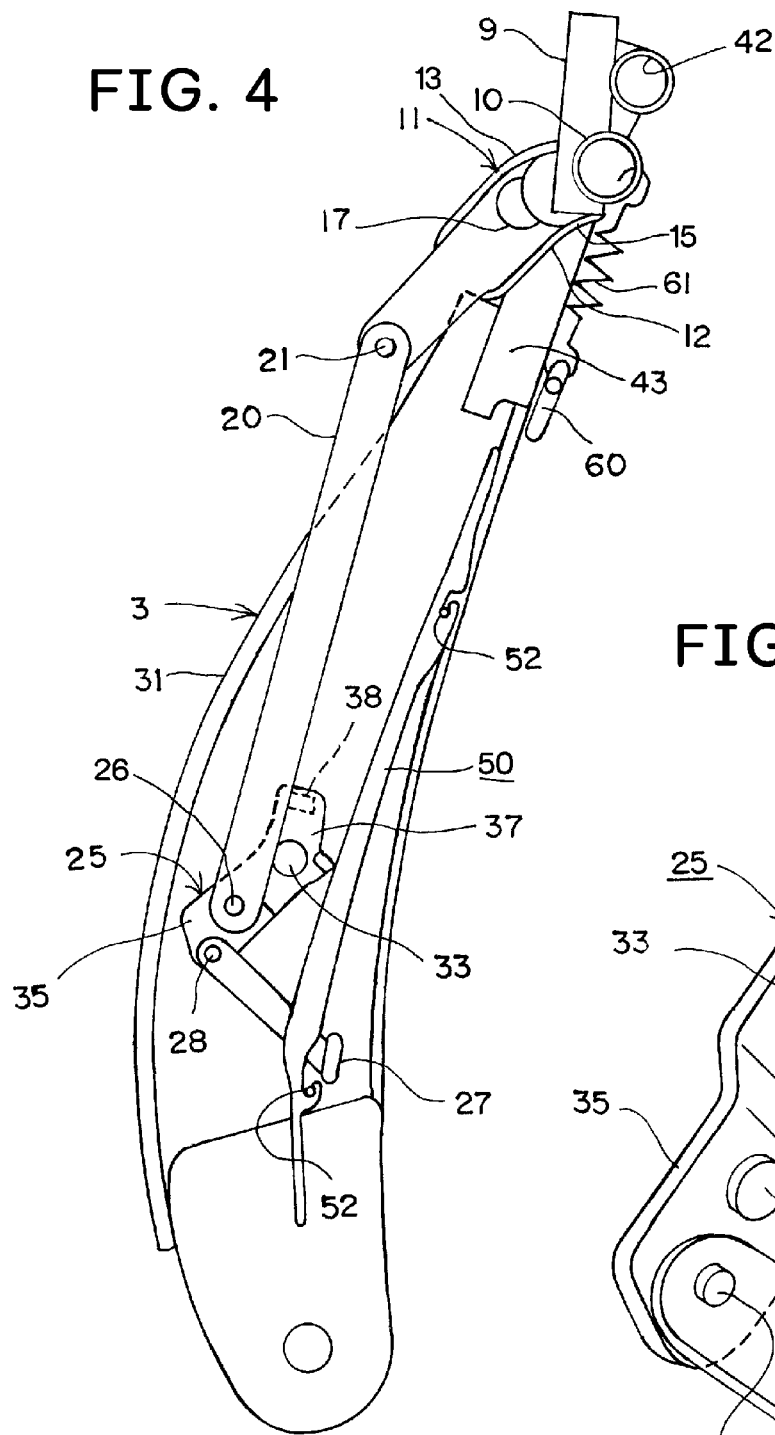
FIG. 4 is a side view of the seatback frame.
Figure 5:
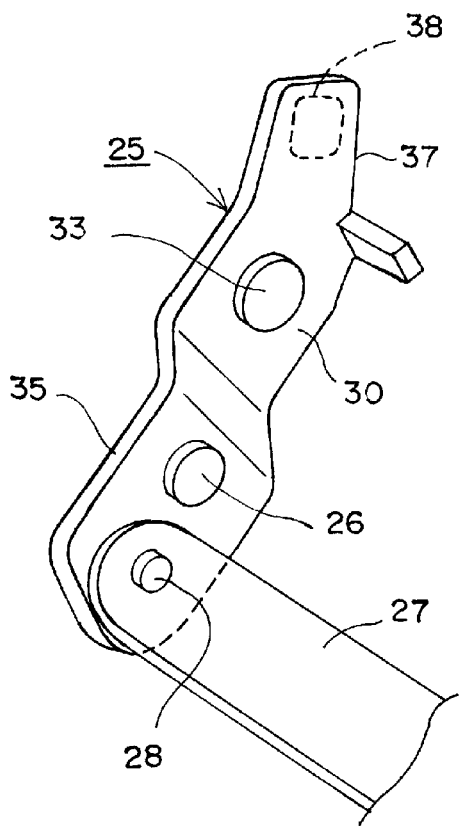
FIG. 5 is a perspective view of a connecting part of a lower link of the seatback and a collision detector.

If the collision detector 27 is moved backward due to a rear-end collision, the connecting arm 35 of the lower link 25 is pulled in the counterclockwise direction in FIG. 4, but because the gap S is formed between the support projection 38 and the side frame 31, the connecting arm 35 rotates smoothly without extra rotational resistance being applied to the lower link 25 to protect the head (cervical part) of the seat occupant T by pushing the headrest 6 forward.

In contrast, if energy of a rear-end collision is huge, the connecting arm 35 of the lower link 25 is pulled in the counterclockwise direction in FIG. 4 and also in an arrow A direction in FIG. 6. These movements may occur at the same time or separately with a time lag. The problem is movement of the connecting arm 35 of the lower link 25 in the arrow A direction in FIG. 6. This movement deviates from the original movement of the lower link 25 and inhibits overall smooth movement. Thus, when the connecting arm 35 is moved in the arrow A direction, the counter arm 37 is moved in a direction opposite to the arrow A direction to bring the support projection 38 into contact with the side frame 31.

If the support projection 38 comes into contact with the side frame 31, movement of the connecting arm 35 in the arrow A direction is severely limited so that unfavorable movement can be suppressed. Because an increase in rotational resistance of the lower link 25 due to contact between the support projection 38 and the side frame 31 is negligible when compared with huge rear collision energy, the lower link 25 rotates smoothly to push the headrest 6 forward so that the head (cervical part) of the seat occupant T can be protected.

The upper frame 40 shows an inverted U-letter shape and has the horizontal pipe frame 42 and vertical pipe frames 43 extending downward from both sides of the pipe frame 42. Lower parts of the vertical pipe frames 43 are superimposed on upper parts of the side frames 31 and then, the superimposed parts are welded for fixing. An important thing is to fix the vertical pipe frames 43 on top of the left and right side frames 31 to secure the wide space part K.

Causing the headrest 6 to move forward by an active headrest mechanism when a rear-end collision occurs is extremely effective in protecting the head of a seated person. It is also extremely effective in protecting a seat occupant when a rear-end collision occurs to efficiently support the upper side of the back of the seated person. Thus, when a rear-end collision occurs, it is desirable that the upper side of the back of the seat occupant be deeply absorbed into the seatback 2. To realize absorption of the seated person, it is effective to provide the wide space part K above the seatback frame 3 and in this application, thanks to the wide space part K, the upper side of the back of the seat occupant can deeply be absorbed into the seatback 2 efficiently.

The invention claimed is:

1. A vehicle seat comprising:
   a seatback frame;
   a headrest mounted on the seatback frame so as to be movable in a front-and-back direction by an active headrest mechanism;
   a collision detector provided on the seatback frame to detect backward movement of a lumbar part of a seat occupant when a rear-end collision occurs;
   wherein the collision detector and the active headrest mechanism are connected with each other by way of a link mechanism so that the headrest is moved forward by the backward movement of the collision detector to support a head of the seat occupant;
   wherein at least an upper frame of the seatback frame in which the active headrest mechanism is provided is formed from a cylindrical member, thereby forming a space part surrounded by the upper frame and side frames on left and right sides above the seatback frame; and
   wherein said link mechanism has a connecting arm connected to the seatback frame by a pivot member, the connecting arm has a first portion extending from the pivot in a first direction and a second portion extending from the pivot in a second direction opposite to the first direction, the first portion is connected to the collision detector, and the second portion is movable in a direction to make contact with the seatback frame to absorb the force of a substantial rear-end collision.

2. The vehicle seat according to claim 1, wherein the upper frame is formed in a C-letter shape by a horizontal pipe frame and vertical pipe frames formed from the cylindrical member, and the active headrest mechanism is positioned inside the space part surrounded by the horizontal pipe frame and the vertical pipe frames of the C-letter shaped upper frame.

3. The vehicle seat according to claim 2, wherein lower parts of the vertical pipe frames on the left and right sides of the upper frame are superimposed on upper parts of the side frames of the seatback frame and superimposed parts are welded for fixing.

4. The vehicle seat according to claim 3, wherein the active headrest mechanism comprises a headrest supporter in a horizontal direction on which pillar support members to support pillars are installed and upper link levers to cause the headrest supporter to move forward with respect to the seatback, the upper link lever integrally forms a link part by linking a connecting rod for transmitting actuation of the collision detector to a bracket part connecting part formed in a C-letter shape by a top plate, a rear plate, and a bottom plate, the link part is installed on the vertical pipe frame by a pivot, and ends of the headrest supporter formed of a cylindrical member are fitted into a space of the connecting part surrounded by the top plate, rear plate, and bottom plate.

5. The vehicle seat according to any claim 1, wherein a single-plate shaped cushion plate that is separate from the collision detector and can support a back of the seat occupant is installed inside a hollow rectangular frame of the seatback frame so as to be freely movable in the longitudinal direction with respect to the seatback frame via seat springs, the collision detector is provided in a rear part of the cushion plate, and an upper edge of the cushion plate is positioned at least above a ninth thoracic vertebrae X of an average seat occupant T to form as wide a space part as possible between the upper edge of the cushion plate and the upper frame.

* * * * *